United States Patent
Bingel

(10) Patent No.: US 6,549,568 B1
(45) Date of Patent: Apr. 15, 2003

(54) METHOD AND APPARATUS FOR AUTOMATICALLY ADJUSTING THE TRANSMIT POWER OF DATA COMMUNICATION EQUIPMENT OPERATING IN A MULTIPOINT ENVIRONMENT

(75) Inventor: Thomas J. Bingel, Belleair Beach, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/248,149

(22) Filed: Feb. 10, 1999

Related U.S. Application Data

(60) Provisional application No. 60/074,182, filed on Feb. 10, 1998.

(51) Int. Cl.[7] .............................. H04B 1/38; H04L 5/16
(52) U.S. Cl. ...................................... 375/222; 375/343
(58) Field of Search ................................ 375/222, 219, 375/221, 229, 230, 343

(56) References Cited

U.S. PATENT DOCUMENTS

| | | | |
|---|---|---|---|
| 5,054,034 A | * | 10/1991 | Hughes-Hartogs .......... 375/222 |
| 5,602,869 A | * | 2/1997 | Scott .......................... 375/222 |
| 6,356,585 B1 | * | 3/2002 | Ko et al. ..................... 375/222 |

* cited by examiner

*Primary Examiner*—Phuong Phu
(74) *Attorney, Agent, or Firm*—Thomas, Kayden, Horstemeyer & Risley, LLP

(57) ABSTRACT

A method and apparatus for automatically adjusting the transmit power level of a data communication equipment (DCE) device being used in an environment in which one or more telephones and one or more DCEs may be connected to the same twisted wire pair. When a telephone goes off-hook, the receiver of the DCE notifies the processor of the DCE that the telephone has gone off-hook. The receiver comprises an equalizer which generates a tap signature based on the off-hook condition of the telephone and deliver the tap signature to the processor. The processor compares the tap signature with tap signatures stored in a memory device until a match has occurred. The processor then reads the transmit power level associated with the matching tap signature out of the memory device and sets the transmit power level of the transmitter of the DCE to the transmit power level read out of the memory device.

22 Claims, 4 Drawing Sheets

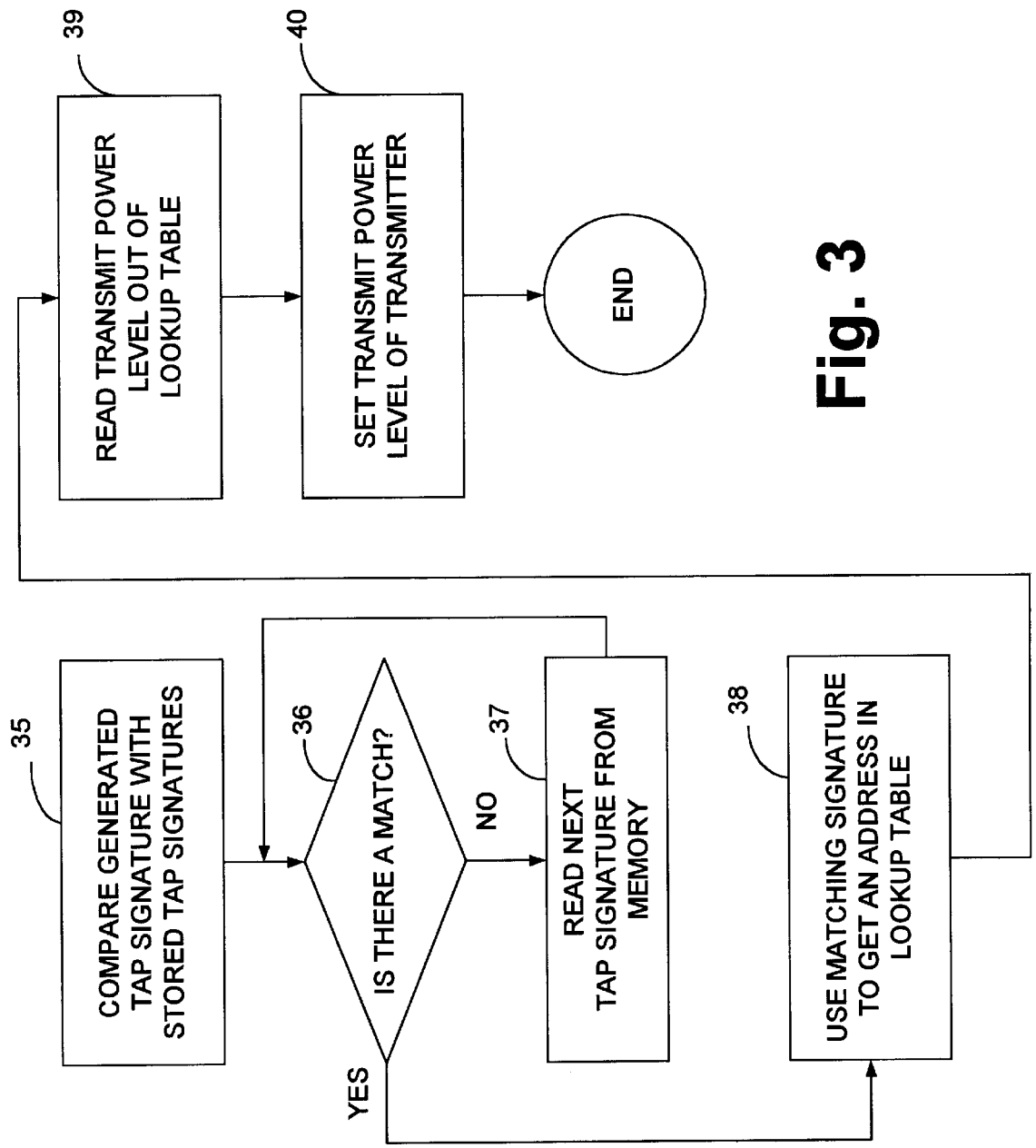

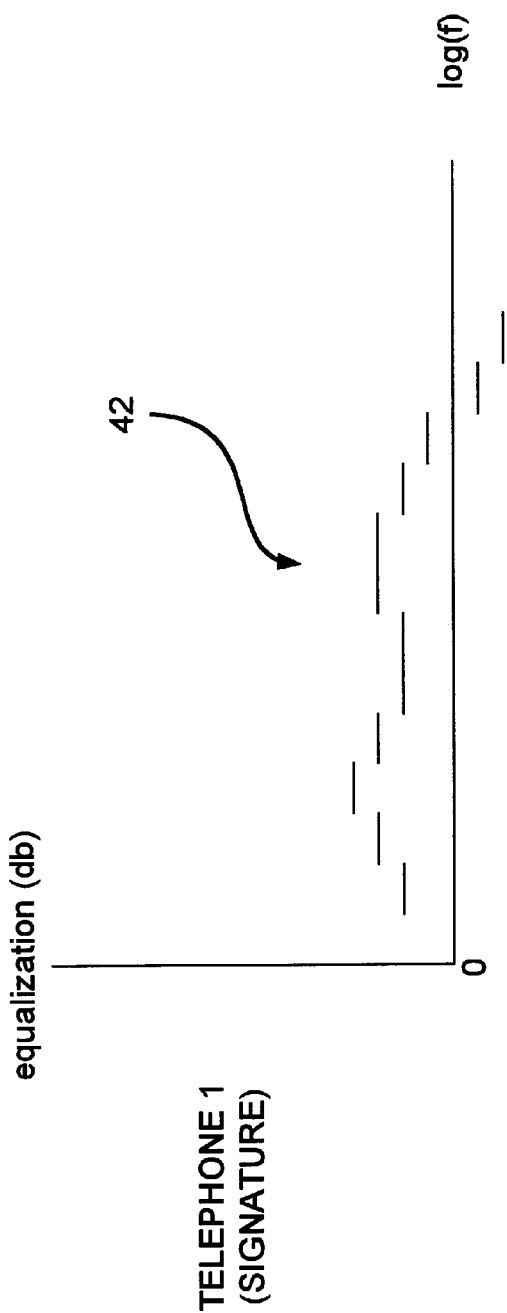
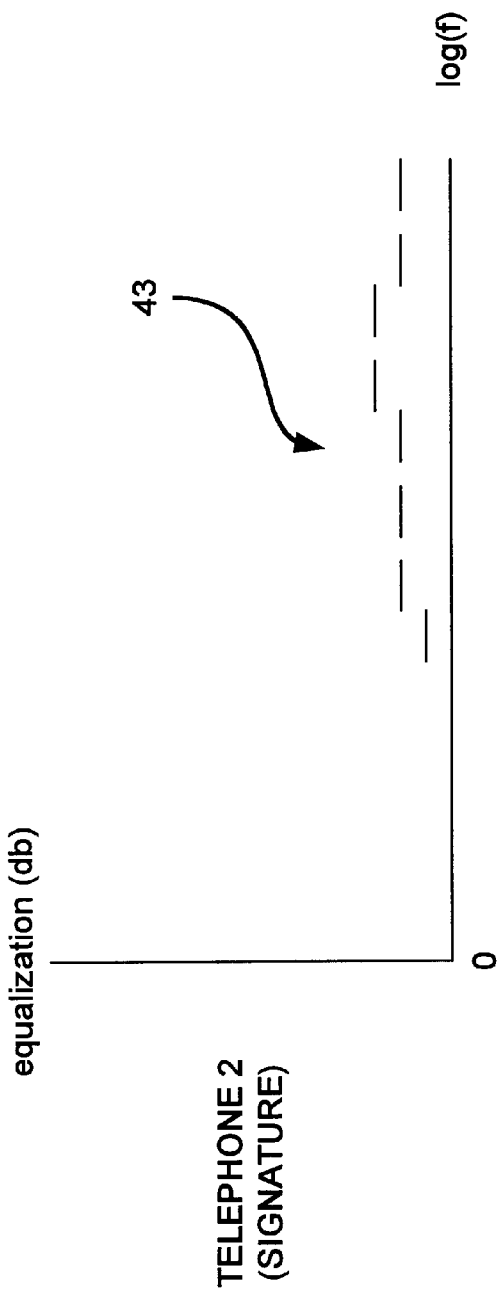

METHOD AND APPARATUS FOR AUTOMATICALLY ADJUSTING THE TRANSMIT POWER OF DATA COMMUNICATION EQUIPMENT OPERATING IN A MULTIPOINT ENVIRONMENT

CROSS REFERENCE TO RELATED APPLICATIONS

This application claims priority to and the benefit of the filing date of a provisional application filed Feb. 10, 1998 entitled "Phone Filter-Less Method For DSL-Lite (G.Lite) and MVL", application Ser. No. 60/074,182, which is incorporated herein by reference in its entirety.

TECHNICAL FIELD OF THE INVENTION

The present invention relates to a method and apparatus for automatically adjusting the transmit power level of data communication equipment (DCE) located at a telecommunication subscriber premises and, more particularly, to a method and apparatus for adjusting the transmit power level of a DCE located at a telecommunication subscriber premises in response to the detection by the DCE of an off-hook signal generated by a telephone which is located at the telecommunication subscriber premises and which is connected to the same copper pair as the DCE.

BACKGROUND OF THE INVENTION

Conventional communications systems typically include two DCEs connected across a communication connection, such as a subscriber loop associated with a public-switched-telephone-network (PSTN). The communication connection is comprised of a pair of copper wires that are terminated at the DCE so that the DCEs may communicate with each other via either half-duplex or full-duplex communications. These DCEs normally include a voltage driver that has a low source impedance for driving the data signal across the connection. Consequently, to effect multipoint communication, bridging additional voltage-driven devices to an end of the communications connection significantly loads the connection making it difficult to successfully communicate across the connection.

As a result of the difficulty of bridging multiple voltage-driven DCE tributaries to the connection, in order to increase the number of DCEs at a particular location, prior art systems typically increase the number of communications connections such that each tributary at a customer premises is serviced by a separate communications connection. The insertion of additional connections into the system increases the overall cost of the system, particularly when the connection is a subscriber loop associated with a PSTN.

Recently, a multipoint system has been developed by the assignee of the present application that allows a plurality of tributaries to be bridged to a standard PSTN telephone twisted pair. The DCEs coupled to each of the tributaries communicate with a DCE located at the central office via a particular polling protocol. Each of the DCEs coupled to the tributaries comprises a current source-driven (i.e., driven by a high-impedance source) analog front end circuit that couples each DCE to its respective tributary via a dry transformer.

In this type of multipoint environment, typically one or more DCEs and one or more telephones are connected to the tributaries which, in turn, are connected to the standard PSTN twisted pair. Since the telephones and DCEs are connected to the same twisted pair, it is possible in some situations for the subscriber to hear the DCEs when the subscriber has his or her ear to the telephone ear piece. This may be due to the fact that telephones are manufactured by many different manufacturers and they often have varying nonlinear distortion properties. Therefore, some telephones will intermodulate the multi-carrier, or Quadrature Amplitude Modulation (QAM), DCE transmit power producing audible noise will be heard by the subscriber.

In order to achieve the highest transmission performance possible, it is desirable to configure DCEs to transmit at the highest possible transmit power level. However, DCEs are capable of successfully transmitting information with high performance even when the transmit power level is less than maximum. Therefore, in multipoint environments, it would be desirable to have a way to adjust the transmit power level of DCEs depending on whether or not a telephone is currently being utilized, i.e., depending on whether or not a telephone is off-hook. It would be particularly desirable to have a DCE which is capable of detecting an off-hook signal and of automatically adjusting its transmit power to a level which is suitable for the telephone which has gone off-hook.

Accordingly, a need exists for a DCE which can be employed in a multipoint environment, which is capable of detecting when an off-hook condition has occurred, and which is capable of adjusting its transmit power level to a level which is appropriate for the telephone that has gone off-hook.

SUMMARY OF THE INVENTION

The present invention provides a method and apparatus for automatically adjusting the transmit power level of data communication equipment (DCE) being used in a multipoint environment. The apparatus of the present invention preferably is comprised in a DCE. The DCE comprises a receiver which receives signals transmitted to the DCE over a transmission medium and a transmitter which transmits signals from the DCE over the transmission medium, which may be a twisted wire pair of a digital subscriber loop. The DCE also comprises a memory device which stores equalizer tap signatures and transmit power levels and a processor which controls the operations of the DCE and which is in communication with the receiver, the transmitter and the memory device.

Each transmit power level stored in the memory device is associated with a particular equalizer tap signature stored in the memory device. In a multipoint environment, at least one telephone and at least one DCE are connected to the same twisted wire pair. When a telephone connected to the twisted wire pair goes off-hook, the receiver notifies the processor that the telephone has gone off-hook. Off-hook detection can be achieved via DC voltage detection across tip and ring or other means. The receiver comprises an equalizer which generates an equalizer tap signature based on the off-hook dial tone of the telephone. The receiver equalizer then delivers a tap signature associated with the off-hook impedance to the processor. The processor compares the equalizer tap signature associated with the off-hook condition with equalizer tap signatures stored in the memory device until an equalizer tap signature has been found which matches (within a prescribed accuracy or tolerance) the equalizer tap signature delivered to the processor from the receiver. When the processor determines that a match has occurred, it then reads the transmit power level associated with the matching equalizer tap signature out of the memory device and sets the transmit power level of the transmitter to the transmit power level read out of the memory device.

In accordance with the preferred embodiment of the present invention, the transmit power levels are stored in the memory device in a lookup table. Each equalizer tap signature stored in the memory device is associated with a respective address in the lookup table. When the processor finds a matching tap signature, the processor uses the matching tap signature to obtain the corresponding address in the lookup table. The transmit power level associated with the matching tap signature is then read out of the lookup table by the processor and the transmitter is set to the transmit power level.

In accordance with the preferred embodiment of the present invention, the tap signatures stored in the memory device are generated by the equalizer during an initialization phase during which a telephone connected to the line is placed in an off-hook condition. Usually upon system initialization, the user who is operating the telephone enters a code on the telephone keypad which the processor detects and utilizes to reduce the transmit power level of the transmitter until the user determines that the transmit power is at a suitable (quiet) level. The processor obtains the tap signature from the receiver which corresponds to the transmit power level after it has been adjusted by the user to a suitable level. The processor stores the tap signature corresponding to the suitable transmit power level in the memory device at a predetermined location and then stores the corresponding transmit power level at a predetermined location in the lookup table in the memory device.

This initialization phase is performed for each telephone and for each DCE connected to the twisted wire pair. Subsequent to the initialization phase, any time a telephone goes off-hook, the processor recognizes the tap signature of the off-hook telephone and causes the transmitter to be set to the appropriate transmit power level. In addition, or in conjunction with adjusting transmit power level, transmit spectrum may be shaped or shifted in frequency to reduce inter-modulation produced audio noise.

These and other features and advantages of the present invention will become apparent from the following discussion, drawings and claims.

BRIEF DESCRIPTION OF THE DRAWINGS

FIG. 3 is a flow chart illustrating the method of the present invention.

FIGS. 4A and 4B are frequency plots of tap signatures generated by an equalizer for two different off-hook telephones connected to the communications line at the subscriber's premises.

DETAILED DESCRIPTION OF THE INVENTION

Figure 1:
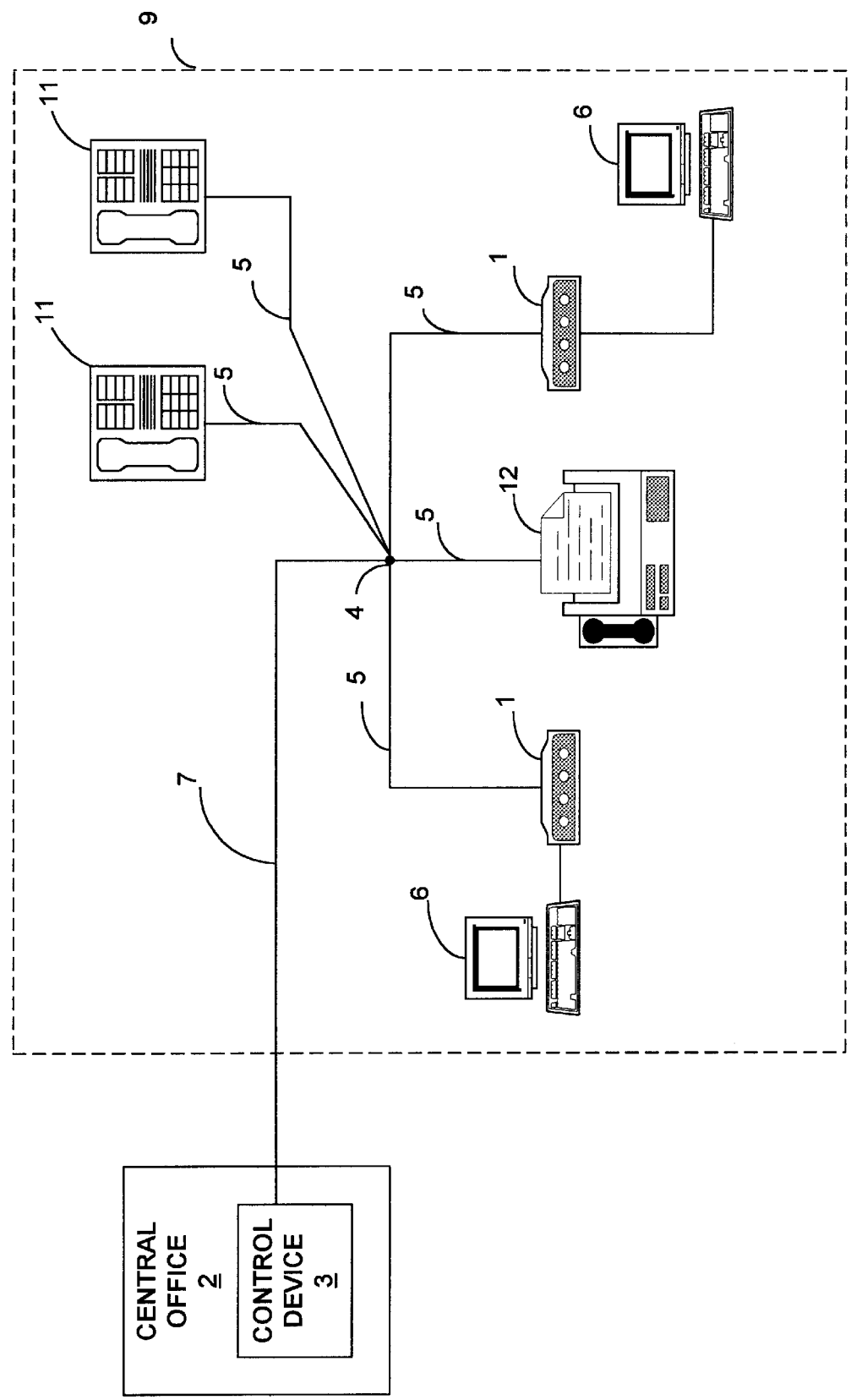
FIG. 1 is a block diagram illustrating a plurality of tributaries connected to a subscriber line in a multipoint environment.

FIG. 1 is a block diagram functionally illustrating a multipoint communications circuit in which the method and apparatus of the present invention may be implemented. FIG. 1 illustrates the connection between a bandwidth-management control device 3 of a facility 2 located at one end of the communications line 7, and data communication equipment 1 (DCE), data terminal equipment (DTE) 6, and other end user devices 11 and 12 located at the other end of the line 7 at another location 9. The control device 3 may be located at, for example, a central office of a telephone network and the DCEs 1. The DCEs 1, DTEs 6 and other end user devices 11 and 12 may be located at some location which is remote to the facility 2, such as at a subscriber's premises. In this case, all of the devices 1, 6, 11 and 12 may be connected directly to the telephone system subscriber line, which corresponds to line 7 in FIG. 1.

In the multipoint environment shown in FIG. 1, the DCEs 1, the telephones 11 and the facsimile machine 12 may be directly connected to line 7, which is a typical PSTN twisted copper pair. The DTEs 6 may be computers or any other type of terminal devices, including, for example, high-speed and low-speed devices. For the purposes of discussion, the DCEs 1 are also referred to interchangeably as modems. The DCEs 1 may be any type of data communications equipment, including, but not limited to, digital subscriber loop (DSL) modems. The control device 3 polls the DCEs 1 to control the outputting of data from the DCEs 1 onto the line 7.

The DTEs 6 and their respective DCEs 1, the telephones 11 and the facsimile machine 12 represent tributaries 5 at the remote location 9. The remote location 9 can be a private residence, a business premises, or any other location. The location designated by the numeral 4 indicates that the tributaries 5 are all bridged to the line 7 at a single communications connection. However, it will be understood by those skilled in the art that the tributaries 5 are not required to be connected to the line 7 at a single point.

In a multipoint environment such as that illustrated in FIG. 1, it is possible that a user will hear audible noise when using one of the telephones 11. This audible noise may be emanating from the modems 1 and may be attributable to the transmit power level of one or more of the modems 1. In accordance with the present invention, the modems 1 are provided with an apparatus that enables the modems 1 to detect when an off-hook signal has occurred when one of the telephones 11 seizes the line 7. When the modem 1 detects the off-hook signal, the modem 1 adjusts its transmit power to a level that is suitable for the telephone 11 that has gone off-hook. At this lower transmit power level, the modem 1 is maintained at a sufficiently high transmit power level to meet performance requirements. Thus, the present invention enables a user to use the telephone in a multipoint environment without being subject to annoying audible noise from the modems. When the telephone 11 is placed on-hook, the modem 1 detects the on-hook condition and can be configured to adjust the transmit power of the modem 1 upwards to an optimum level.

In accordance with the preferred embodiment of the present invention, a user performs an initialization setup routine to set the modems 1 to suitable transmit power levels. To perform this task, the user picks up a telephone at the remote location 9 and listens for intermodulation noise from the modem 1. During the initialization setup routine, only one modem at remote location 9 is in operation at a time. Using preselected keys on the telephone keypad, the user then adjusts the transmit power level down to a level at which the user does not hear, or just barely hears, audible noise. The modem 1 being initialized comprises equalizer taps which the modem utilizes to obtain a tap signature for the particular telephone that is off-hook. The modem 1 memorizes the tap settings and the transmit power level that it was set to during the initalization routine.

Subsequent to the initialization setup phase, whenever that particular telephone goes off-hook, the modem 1 detects which telephone has gone off hook by comparing tap signatures stored in memory with the tap signature generated by the modem 1 for the off-hook telephone. The tap signature stored in memory that matches the tap signature for the off-hook telephone is then used by the modem 1 to obtain the corresponding transmit power level from a lookup table stored in memory. The modem 1 then sets itself to this transmit power level.

Figure 2:
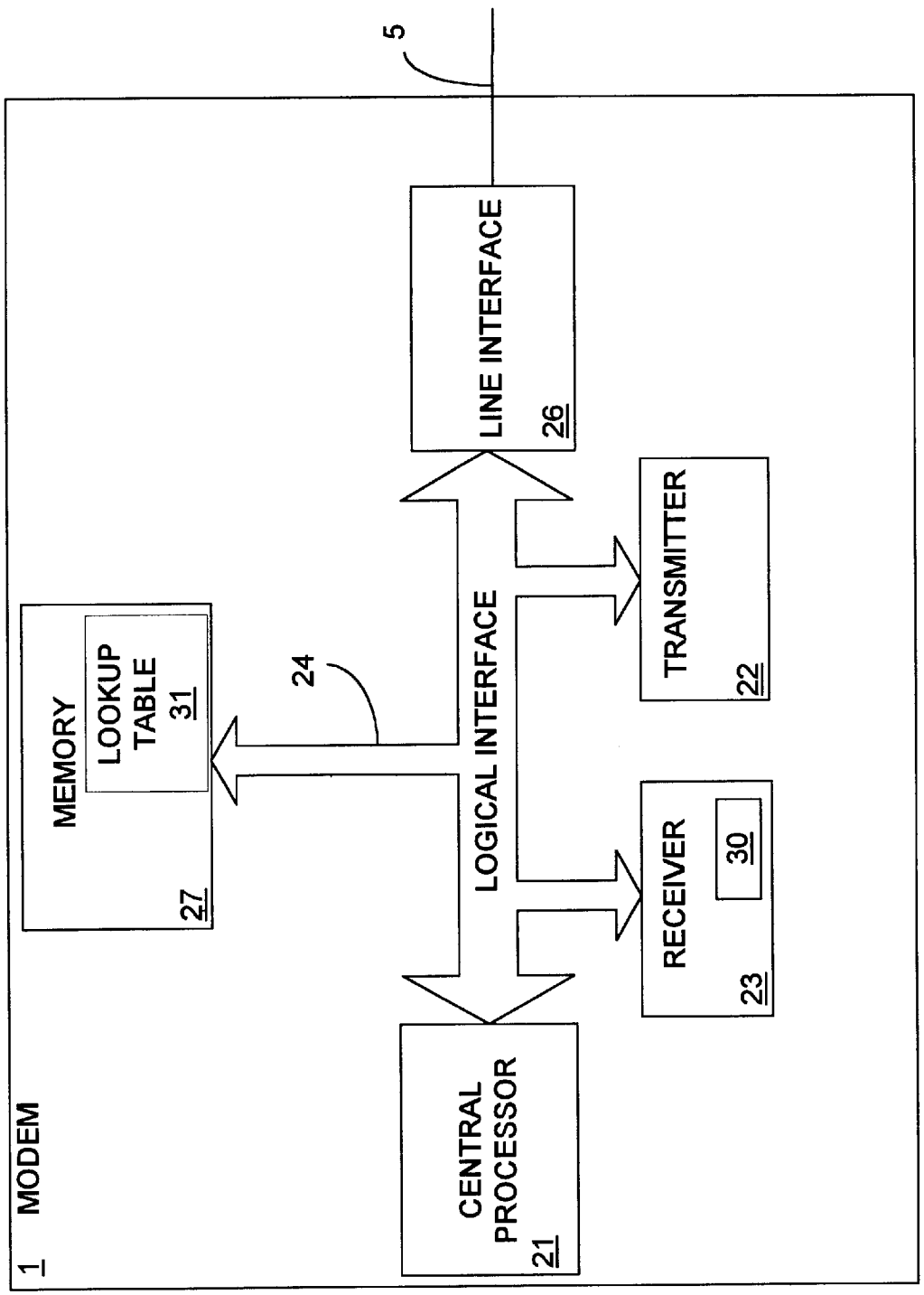
FIG. 2 is a block diagram of the DCE of the present invention.

FIG. 2 illustrates a block diagram of the modem 1 of the present invention in accordance with the preferred embodiment. The modem 1 of the present invention generally contains conventional components which are well known in the art of data communications. Preferably, the method of the present invention is implemented in software which is stored in memory device 27. The central processor 21 controls the operation of the transmitter 22 and receiver 23 of modem 1 via a logical interface 24, and couples to line interface 26 to communications channel 5, which is the tributary comprising the modem 1. The equalizer 30 of the present invention is comprised within the receiver portion 23 of the modem 1. For example, the equalizer 30 comprises 30 taps covering a range of approximately 192 KHz, which provides the equalizer with a tap resolution of approximately 6 KHz per tap. However, those skilled in the art will understand that the present invention is not limited with respect to the number of taps that is comprised by the equalizer.

As stated above, the tap signatures for each telephone 11 located at the remote site 9 are obtained during the initialization phase. The tap signatures and the transmit power levels associated with the tap signatures are stored in memory device 27. The memory device 27 includes a lookup table 31 in which the modem transmit power levels associated with respective tap signatures are stored. Subsequent to the initialization phase, when a telephone 11 goes off-hook, the receiver 23 detects the off-hook signal and the equalizer 30 of the receiver 23 generates a tap signature. The central processor 21 receives a notification from the receiver 23 that the telephone has gone off-hook as well as a digital tap signature generated by the receiver 23.

When the central processor 21 receives the off-hook notification from the receiver 23, the central processor 21 invokes the routine of the present invention for setting the transmit power level of the modem 1, which is illustrated in the flow chart of FIG. 3. In accordance with this routine, the central processor 21 compares the tap signature generated by the equalizer 30 with the tap signatures stored in memory device 27, as indicated by block 35. At block 36, a determination is made as to whether or not the generated tap signature matches the tap signature with which it is being compared. If not, the central processor 21 obtains the next tap signature from the memory device 27 and compares it with the generated tap signature. This process continues until a matching tap signature is found, as indicated by block 37.

When the remote site 9 is relatively close to the central office 2, the control device 3 may contribute to the noise heard by the user when the user puts the ear piece of the telephone 11 to his or her ear. In accordance with another aspect of the present invention, one of the modems 1 will sense how far the modem 1 is from the control device 3 based on the signal level of the control device 3. The modem 1 will then cause the transmit power level of the control device 3 to be adjusted to a level which is suitable for the distance between the control device 3 and the modem 1. The modem 1 accomplishes this by sending a control code to the control device 3 which causes the control device to adjust its transmit power level.

It should also be noted that the method illustrated in FIG. 3 can also be used, not only to decrease the transmit power level of the transmitter 22, but also to increase the transmit power level of the transmitter 22 to provide better user selectivity. In addition, the method illustrated in FIG. 3 may also be used to shift the frequency spectrum up and down and to shape and unshape the frequency spectrum to assist the user in optimizing the modem performance-to-telephone audio noise trade off during the initialization phase. In this case, rather than the transmit power level of the transmitter 22 being shifted to a lower level when an off-hook condition occurs, the transmit power level is shifted to a lower level when an off-hook condition is detected. During the initialization phase, the user would use the telephone keypad to increase the transmit power level of the transmitter 22. The corresponding tap signature and the associated transmit power level would then be stored in the memory device 27. It should also be noted that it would be possible for the user to watch the data rate of the signal being output by the modem 1 on a display screen (not shown) to enable the user to adjust the transmit power level to achieve the highest data rate possible without hearing too much noise.

Once a matching tap signature is found, the central processor 21 uses the matching tap signature to obtain an address for the lookup table 31 comprised in memory device 27, as indicated by block 38. This address contains the transmit power level for the modem 1 which is to be used when the particular telephone is off-hook. The central processor 21 reads the transmit power level out of the lookup table 31 of the memory device 27, as indicated by block 39, and uses it to set the transmit power level of the transmitter 22, as indicated by block 40. It should be noted that the lookup table 31 can be located in a memory device which is separate from the memory device 27. If no matching tap signature is found in the look-up table, then the transmitter power is set to a default for this condition.

FIGS. 4A and 4B illustrate frequency plots of two tap signatures for two different telephones, namely, telephones 1 and 2. When telephone 1 is taken off-hook, the modem 1 detects the off-hook condition and the equalizer 30 re-equalizes and generates the tap signature 42. When telephone 2 is taken off-hook, the modem 1 re-equalizes and generates the tap signature 43. As stated above, these tap signatures are distinguishable and the processor 21 is able to obtain the corresponding transmit power levels from the lookup table 31.

When more than one telephone is off-hook at a time, the modem 1 can detect this situation as a result of a shift in the DC voltage level of the subscriber line. When this situation occurs, it may be difficult for the processor 21 to determine what the corresponding transmit power level should be set to for the transmitter. Therefore, the modem 1 preferably will set the transmit power level to a predetermined default level. However, those skilled in the art will understand that it may be possible to obtain meaningful tap signatures in the case where more than one telephone is off-hook at the same time and to set the transmit power level accordingly.

It should also be noted that the tap signatures generated by a telephone going off-hook can also be used to shape the spectrum of the signal being transmitted by the transmitter 22 of the modem 1 and to shift the spectrum of the signal being transmitted by the modem 1. Therefore, the tap signatures can be used as the basis for (1) selecting a transmit power level for the signal being transmitted, and/or (2) shaping the frequency spectrum of the signal being transmitted, and/or (3) shifting the frequency spectrum of the signal being transmitted. All of these methods can be utilized to reduce the intermodulation products occurring in the audio band. With respect to the control device 3, the control code transmitted from the modem 1 to the control device 3 may also be used to shape or shift the frequency spectrum of the signal being transmitted by the control device 3 in addition to being used to adjust the transmit power level of the control device 3.

The modem 1 preferably operates over a frequency spectrum of from approximately 20 KHz to approximately 80 KHz, although those skilled in the art will understand that the present invention is not limited with respect to the frequency spectrum utilized by the modem 1. In the lower end of this spectrum, which is the closest to the audio frequency band, most of the intermodulation noise will occur, as is well understood by those skilled in the art. Besides simply lowering the transmit power level equally over the entire spectrum, shifting the frequency spectrum upwards, can reduce intermodulation components in the audio band. Therefore, it may be desirable to shift the frequency spectrum such that it starts at 30 or 40 KHz, for example.

However, at higher frequencies, the data signal is subject to higher loss and more cross-talk. Therefore, if the frequency spectrum is simply shifted upwards, this can result in higher loss in the data signal over the frequency spectrum, and thus, a lower signal-to-noise ratio. Frequency spectrum shaping can be used to ensure that less energy is contained in the lower frequencies of the spectrum and more energy is contained in the higher frequencies of the spectrum. By reducing the amount of energy contained in the lower frequencies, and by increasing the amount of energy occurring in the higher frequencies of the spectrum, the intermodulation products occurring in the audio band can be reduced, while maintaining a relatively high signal-to-noise ratio.

In multipoint environments, it has been determined that some telephones need phone filters and others do not. Also, in some cases it is difficult to install a phone filter on a telephone. For example, a kitchen telephone that is designed to hang on the wall is typically not well adapted to be equipped with a phone filter. Therefore, in some multipoint environments, one or more telephones may be equipped with phone filters and one or more other telephones may not be equipped with phone filters. The method and apparatus of the present invention will operate in such an environment. Therefore, the method and apparatus of the present invention are suitable for use in a splitterless, multipoint environment in which xDSL modems are connected to the same twisted wire pair that other end user devices (e.g., telephones with filters, telephones without filters, facsimile machines, etc.).

If a telephone is equipped with a phone filter, the method of FIG. 3 will not need to be performed since any noise attributable to the modems should be filtered out by the phone filters. In this case, when the user places the telephone in an off-hook condition, the user can press a predetermined key on the key pad which informs the central processor 21 that the transmit power level of the equalizer 30 does not have to be adjusted. However, the method of FIG. 3 will need to be performed with telephones that are not equipped with phone filters. It should be noted that the present invention has been described with reference to the preferred embodiment and that the present invention is not limited to this embodiment. It will be understood by those skilled in the art that modifications may be made to the embodiment discussed above which are within the scope of the present invention. For example, although it is preferable to have each DCE analyze the tap signatures generated by the telephones when they go off-hook and adjust their own transmit power levels accordingly, it will be understood by those skilled in the art that the apparatus of the present invention may also be implemented external to the DCEs. For example, the apparatus of the present invention could also be connected to the twisted wire pair at the remote location 9, but external to the DCEs. The apparatus would generate the tap signature of any telephone that goes off-hook, match the tap signature with a tap signature stored in memory, use the matching tap signature to obtain the associated transmit power level, and send signals to the DCEs to cause the transmit power levels of the DCEs to be adjusted accordingly. Those skilled in the art will understand the manner in which this could be accomplished in view of the discussion provided herein.

It should also be noted that, although the method of the present invention preferably is implemented primarily in software being executed by the processor 21, the method of the present invention could be implemented solely in hardware or in a combination of software and hardware (e.g., firmware). Those skilled in the art will understand how the present invention could be implemented in these and other forms.

What is claimed is:

1. A modem for use in a multipoint environment, the modem being coupled to a transmission medium, the modem comprising:

a receiver which receives signals transmitted to the modem over the transmission medium, the receiver comprising an equalizer which generates tap signatures based on an off-hook condition of a telephone, the telephone being coupled to the transmission medium;

a transmitter which transmits signals over the transmission medium;

a memory device which stores tap signatures and transmit power levels, each transmit power level being associated with a particular tap signature; and a processor in communication with the receiver, the transmitter and the memory device, wherein when a telephone connected to the transmission medium goes off-hook, the receiver notifies the processor that the telephone has gone off-hook, and wherein the receiver delivers a tap signature associated with the off-hook condition to the processor, and wherein the processor compares the tap signature associated with the off-hook condition with at least one tap signature stored in the memory device in order to find a tap signature stored in the memory device which matches the tap signature delivered to the processor from the receiver, wherein when the processor determines that a match has occurred, the processor reads the transmit power level associated with the matching tap signature out of the memory device and sets the transmit power level of the transmitter to the transmit power level read out of the memory device.

2. The apparatus of claim 1, wherein the transmit power levels are stored in the memory device in a lookup table and wherein each tap signature stored in the memory device is associated with a respective address in the lookup table and wherein once the processor has found a matching tap signature, the processor uses the matching tap signature to obtain the corresponding address in the lookup table and reads the transmit power level associated with the matching tap signature out of the lookup table.

3. The apparatus of claim 2, wherein the tap signatures stored in the memory device are generated by the equalizer during an initialization phase, wherein during the initiliation phase, a telephone connected to the line is placed in an off-hook condition such that the telephone generates a dial tone, and wherein the equalizer generates a tap signature which corresponds to the dial tone, and wherein a user who is operating the telephone enters a code on a keypad of the telephone which the processor utilizes to adjust the transmit power level of the transmitter until the user determines that the transmit power level of the transmitter is set at a suitable level, and wherein the processor obtains the tap signature from the receiver which corresponds to the transmit power level set by the user and stores the tap signature obtained from the receiver in the memory device at a predetermined location, and wherein the processor stores the transmit power level set by the user at a predetermined location in the lookup table of the memory device.

4. The apparatus of claim 3, wherein the transmission medium is a twisted wire pair, and wherein the modem and the telephone are connected to the twisted wire pair.

5. A modem for use in a multipoint environment, the modem comprising:
    means for receiving signals transmitted to the modem over a transmission medium, the receiving means comprising a means for generating a tap signature;
    means for transmitting signals over the transmission medium;
    means for storing tap signatures and transmit power levels, each transmit power level being associated with a particular tap signature; and
    means for controlling the modem, the means for controlling the modem being in communication with the receiving means, the transmitting means and the storing means, wherein when a telephone connected to the transmission medium goes off-hook, the receiving means notifies the controlling means that the telephone has gone off-hook, and wherein the receiving means delivers a tap signature associated with the off-hook condition to the controlling means, the controlling means comparing the tap signature associated with the off-hook condition with at least one tap signature stored in the storing means in order to find a tap signature stored in the storing means which matches the tap signature delivered to the controlling means, wherein when the controlling means determines that a match has occurred, the controlling means reads the transmit power level associated with the matching tap signature out of the storing means and sets the transmit power level of the transmitter to the transmit power level read out of the storing means.

6. The apparatus of claim 5, wherein the tap signatures are stored in the storing means in a lookup table and wherein each tap signature stored in the storing means is associated with a respective address in the lookup table and wherein once the controlling means has found a matching tap signature, the controlling means uses the matching tap signature to obtain the corresponding address in the lookup table and reads the transmit power level stored at the corresponding address in the lookup table out of the lookup table, the controlling means setting the transmitting means to the transmit power level read out of the lookup table.

7. The apparatus of claim 6, wherein the tap signatures stored in the storing means are generated by the means for generating tap signatures during an initialization phase during which a telephone connected to the transmission medium is placed in an off-hook condition, and wherein the means for generating tap signatures generates a tap signature which corresponds to the off-hook telephone condition, and wherein a user who is operating the telephone enters a code on a keypad of the telephone which the processor utilizes to adjust the transmit power level of the transmitter to a suitable level and wherein the controlling means stores the tap signature corresponding to the suitable transmit power level in the storing means at a predetermined location, and wherein the controlling means stores the suitable transmit power level at a predetermined location in the lookup table of the storing means.

8. The apparatus of claim 7, wherein the transmission medium is a twisted wire pair, and wherein the modem and the telephone are connected to the twisted wire pair.

9. A method for automatically adjusting the transmit power level of a modem operating in a multipoint environment, the modem being connected to a transmission medium, the method comprising the steps of:
    receiving signals transmitted to the modem over the transmission medium, the signals being received in a receiver of the modem, the receiver comprising an equalizer;
    generating a tap signature in the equalizer, the tap signature corresponding to telephone that has been placed in an off-hook condition;
    comparing the generated tap signature with a tap signature stored in a memory device to identify a tap signature stored in the memory device which matches the generated tap signature, each tap signature stored in the memory device being associated with a particular transmit power level stored in the memory device; and
    when a matching tap signature contained in the memory device has been identified, reading the transmit power level associated with the matching tap signature out of the memory device and setting the transmit power level of a transmitter comprised in the modem to the transmit power level read out of the memory device.

10. The method of claim 9, wherein the transmit power levels are stored in the memory device in a lookup table and wherein each tap signature stored in the memory device is associated with a respective address in the lookup table, wherein when a matching tap signature contained in the memory device has been found, the matching tap signature is used to obtain the corresponding address of the associated transmit power level in the lookup table.

11. The method of claim 10, wherein the comparing step is performed by a processor of the modem, and wherein the tap signatures stored in the memory device in the lookup table are generated by the equalizer during an initialization phase during which a telephone connected to the transmission medium is placed in an off-hook condition, the telephone generating a dial tone in the off-hook condition, and wherein the equalizer generates a tap signature which corresponds to the dial tone, and wherein a user who is operating the telephone enters a code on a keypad of the telephone which is utilized by the processor to adjust the transmit power level of the transmitter to a level which is suitable to the user, and wherein the processor stores the tap signature corresponding to the suitable transmit power level in the memory device at a predetermined location, and wherein the processor stores the suitable transmit power level at a predetermined location in the lookup table in the memory device.

12. The method of claim 11, wherein the transmission medium is a twisted wire pair, and wherein the modem and the telephone are connected to the twisted wire pair.

13. A computer program embodied on a computer-readable medium, the computer program determining a suitable transmit power level for a modem the computer program being executed by a processor of the modem, the computer program comprising:

a first code segment for determining whether a tap signature generated by an equalizer comprised by the modem matches a tap signature stored in a memory device, the first code segment comparing the generated tap signature with one or more tap signatures stored in the memory device until the first code segment determines that one of the tap signatures stored in the memory device matches the tap signature generated by the equalizer;

a second code segment which utilizes the matching tap signature stored in the memory device to generate an address in a lookup table, the second code segment reading a transmit power level stored at said address in the lookup table out of the lookup table;

a third code segment which utilizes the transmit power level read out of the lookup table to set a transmit power level of a transmitter of the modem.

14. The computer program of claim 13, wherein the computer program further comprises an initialization code segment, the initialization code segment being executed prior to the first, second and third code segments being executed, wherein the initialization code segment determines when an indication has been received by the processor indicating that a suitable transmit power level has been set for the modem, the initialization segment causing the suitable transmit power level to be stored at a predetermined address in the lookup table, the suitable transmit power level being associated with a particular tap signature, the initialization code segment causing the tap signature associated with the suitable transmit power level to be stored in the memory device at a predetermined address.

15. A modem for use in a multipoint environment, the modem being coupled to a transmission medium, the modem comprising:

a receiver which receives signals transmitted to the modem over the transmission medium, the receiver comprising an equalizer which generates tap signatures based on an off-hook condition of a telephone, the telephone being coupled to the transmission medium;

a transmitter which transmits signals over the transmission medium;

a memory device which stores tap signatures and a frequency spectrum shift amount, each frequency spectrum shift amount being associated with a particular tap signature; and a processor in communication with the receiver, the transmitter and the memory device, wherein when a telephone connected to the transmission medium goes off-hook, the receiver notifies the processor that the telephone has gone off-hook, and wherein the receiver delivers a tap signature associated with the off-hook condition to the processor, and wherein the processor compares the tap signature associated with the off-hook condition with at least one tap signature stored in the memory device in order to find a tap signature stored in the memory device which matches the tap signature delivered to the processor from the receiver, wherein when the processor determines that a match has occurred, the processor reads the frequency spectrum shift amount associated with the matching tap signature out of the memory device and sets the frequency spectrum shift amount of the transmitter to the frequency spectrum shift amount read out of the memory device.

16. The apparatus of claim 15, wherein the frequency spectrum shift amounts are stored in the memory device in a lookup table and wherein each tap signature stored in the memory device is associated with a respective address in the lookup table and wherein once the processor has found a matching tap signature, the processor uses the matching tap signature to obtain the corresponding address in the lookup table and reads the frequency spectrum shift amount associated with the matching tap signature out of the lookup table.

17. The apparatus of claim 16, wherein the tap signatures stored in the memory device are generated by the equalizer during an initialization phase, wherein during the initialization phase, a telephone connected to the line is placed in an off-hook condition, and wherein the equalizer generates a tap signature which corresponds to the off-hook condition, and wherein a user who is operating the telephone enters a code on a keypad of the telephone which the processor utilizes to adjust the frequency spectrum shift amount of the transmitter until the user determines that the frequency spectrum shift amount of the transmitter is set at a suitable level, and wherein the processor obtains the tap signature from the receiver which corresponds to the frequency spectrum shift amount set by the user and stores the tap signature obtained from the receiver in the memory device at a predetermined location, and wherein the processor stores the frequency spectrum shift amount set by the user at a predetermined location in the lookup table of the memory device.

18. The apparatus of claim 17, wherein the transmission medium is a twisted wire pair, and wherein the modem and the telephone are connected to the twisted wire pair.

19. A modem for use in a multipoint environment the modem being coupled to a transmission medium, the modem comprising:

a receiver which receives signals transmitted to the modem over the transmission medium, the receiver comprising an equalizer which generates tap signatures based on an off-hook condition of a telephone, the telephone being coupled to the transmission medium;

a transmitter which transmits signals over the transmission medium;

a memory device which stores tap signatures and frequency spectrum shapes, each frequency spectrum shape being associated with a particular tap signature; and a processor in communication with the receiver, the transmitter and the memory device, wherein when a telephone connected to the transmission medium goes off-hook, the receiver notifies the processor that the telephone has gone off-hook, and wherein the receiver delivers a tap signature associated with the off-hook condition to the processor, and wherein the processor compares the tap signature associated with the off-hook condition with at least one tap signature stored in the memory device in order to find a tap signature stored in the memory device which matches the tap signature delivered to the processor from the receiver, wherein when the processor determines that a match has occurred, the processor reads the frequency spectrum shape associated with the matching tap signature out of the memory device and sets the frequency spectrum shape of the signal being transmitted by transmitter to the frequency spectrum shape read out of the memory device.

20. The apparatus of claim 19, wherein the frequency spectrum shapes are stored in the memory device in a lookup table and wherein each tap signature stored in the memory device is associated with a respective address in the lookup table and wherein once the processor has found a matching tap signature, the processor uses the matching tap signature to obtain the corresponding address in the lookup table and reads the frequency spectrum shape associated with the matching tap signature out of the lookup table.

21. The apparatus of claim 20, wherein the tap signatures stored in the memory device are generated by the equalizer during an initialization phase, wherein during the initialization phase, a telephone connected to the line is placed in an off-hook condition, and wherein the equalizer generates a tap signature which corresponds to the off-hook condition, and wherein a user who is operating the telephone enters a code on a keypad of the telephone which the processor utilizes to adjust the frequency spectrum shape of the signal being transmitted by the transmitter until the user determines that the frequency spectrum shape of the signal being transmitted by the transmitter is set at a suitable level, and wherein the processor obtains the tap signature from the receiver which corresponds to the frequency spectrum shape set by the user and stores the tap signature obtained from the receiver in the memory device at a predetermined location, and wherein the processor stores the frequency spectrum shape set by the user at a predetermined location in the lookup table of the memory device.

22. The apparatus of claim 21, wherein the transmission medium is a twisted wire pair, and wherein the modem and the telephone are connected to the twisted wire pair.

* * * * *